(12) United States Patent
Yoon et al.

(10) Patent No.: US 11,893,805 B1
(45) Date of Patent: Feb. 6, 2024

(54) SERVICE SYSTEM AND METHOD FOR DETECTING NUMBER OF IN-VEHICLE PERSONS OF VEHICLE IN HIGH OCCUPANCY VEHICLE LANE

(71) Applicant: G&T Solutions, Inc., Seoul (KR)

(72) Inventors: Heedon Yoon, Seoul (KR); Yujeong Choe, Incheon (KR); Sangcheol Kang, Seoul (KR); Inwon Yeon, Seoul (KR)

(73) Assignee: G&T Solutions, Inc., Seoul (KR)

( * ) Notice: Subject to any disclaimer, the term of this patent is extended or adjusted under 35 U.S.C. 154(b) by 0 days.

(21) Appl. No.: 18/383,413

(22) Filed: Oct. 24, 2023

(30) Foreign Application Priority Data

Mar. 17, 2023 (KR) .......................... 10-2023-0035477

(51) Int. Cl.
*G06V 20/59* (2022.01)
*G06V 20/62* (2022.01)
*G06V 20/70* (2022.01)
*H04N 7/18* (2006.01)

(52) U.S. Cl.
CPC .......... *G06V 20/593* (2022.01); *G06V 20/625* (2022.01); *G06V 20/70* (2022.01); *H04N 7/181* (2013.01)

(58) Field of Classification Search
CPC ..... G06V 20/593; G06V 20/59; G06V 20/625
See application file for complete search history.

(56) References Cited

U.S. PATENT DOCUMENTS 9,760,784 B2 * 9/2017 Oami .................... G06V 20/593
2015/0278617 A1 * 10/2015 Oami .................... G06V 20/593
382/103

2017/0068863 A1 * 3/2017 Rattner ................... G06V 40/10
2017/0116489 A1 * 4/2017 Porsch ................. G06V 20/593
2019/0050654 A1 * 2/2019 Payne-Short ........ G06V 20/593
(Continued)

FOREIGN PATENT DOCUMENTS

EP 2924663 A1 * 9/2015 ............. B64D 47/08
KR 10-2021-0042579 A 1/2021
(Continued)

OTHER PUBLICATIONS

Y. Artan, O. Bulan, R. P. Loce and P. Paul, "Passenger Compartment Violation Detection in HOV/HOT Lanes," in IEEE Transactions on Intelligent Transportation Systems, vol. 17, No. 2, pp. 395-405, Feb. 2016, doi: 10.1109/TITS.2015.2475721. (Year: 2016).*

*Primary Examiner* — Michael Robert Cammarata
(74) *Attorney, Agent, or Firm* — Heedong Chae; Lucem, PC (57) ABSTRACT

The present disclosure relates to a service system and method for detecting the number of in-vehicle persons of a vehicle in a high occupancy vehicle lane. In more detail, the present disclosure relates to a service system and method for detecting the number of in-vehicle persons of a vehicle in a high occupancy vehicle lane, the service system and method detecting a vehicle violating the law about use of a high occupancy vehicle lane by calculating the number of in-vehicle persons of a vehicle using a high occupancy vehicle lane by tracking the number of in-vehicle persons on the basis of images of the vehicle taken by a camera disposed diagonally to the traveling direction of the vehicle and a camera disposed orthogonally to the traveling direction of the vehicle.

9 Claims, 8 Drawing Sheets

(56) References Cited

U.S. PATENT DOCUMENTS

| | | | | |
|---|---|---|---|---|
| 2019/0184933 A1* | 6/2019 | Yamamoto | ............ | G06V 20/59 |
| 2019/0253671 A1* | 8/2019 | Miyanaka | ............ | G06V 20/593 |
| 2019/0325603 A1* | 10/2019 | Nogimori | ............ | G06V 10/426 |
| 2023/0290172 A1* | 9/2023 | Ali | ....................... | G06V 20/586 |
| | | | | 348/159 |
| 2023/0376722 A1* | 11/2023 | Nyalamadugu | ...... | H01Q 1/3266 |

FOREIGN PATENT DOCUMENTS

| | | | | |
|---|---|---|---|---|
| KR | 20210140758 A | * | 11/2021 | |
| KR | 10-2022-0051991 A | | 4/2022 | |
| KR | 10-2443514 B1 | | 9/2022 | |
| KR | 102570386 B1 | * | 8/2023 | |
| WO | WO-2012160251 A2 | * | 11/2012 | ......... G06K 9/00845 |

\* cited by examiner

FIG. 7 final number of in-vehicle persons:10 persons

FIG. 8

SERVICE SYSTEM AND METHOD FOR DETECTING NUMBER OF IN-VEHICLE PERSONS OF VEHICLE IN HIGH OCCUPANCY VEHICLE LANE

CROSS REFERENCE TO RELATED APPLICATION

The present application claims priority to Korean Patent Applications No. 10-2023-0035477, filed Mar. 17, 2023 the entire contents of which are incorporated herein for all purposes by this reference.

BACKGROUND

Technical Field

The present disclosure relates to a service system and method for detecting the number of in-vehicle persons of a vehicle in a high occupancy vehicle lane. In more detail, the present disclosure relates to a service system and method for detecting the number of in-vehicle persons of a vehicle in a high occupancy vehicle lane, the service system and method detecting a vehicle violating the law about use of a high occupancy vehicle lane by calculating the number of in-vehicle persons of a vehicle using a high occupancy vehicle lane by tracking the number of in-vehicle persons on the basis of images of the vehicle taken by a camera disposed diagonally to the traveling direction of the vehicle and a camera disposed orthogonally to the traveling direction of the vehicle.

Description of the Related Art

According to the current regulation on violation of the exclusive bus lanes of highways, when vehicles excluding 9 or more-seater passenger cars and vans (including the case when six or more persons are in passenger cars or 12 or less-seater vans) that are driven on a highway use an exclusive bus lane, these vehicles are the objects of sanction under relevant laws. Further, even in the case of vehicles that are not buses but allowed to use exclusive bus lanes, when the number of in-vehicle persons of vehicles does not satisfy 6 that is a reference number of persons for using exclusive bus lanes, the vehicles are also objects of sanction.

Recently, as traffic congestion increases, vehicles that use exclusive bus lanes without satisfying the reference number of persons that allows use of exclusive bus lanes are increasing, and accordingly, traffic congestion in exclusive bus lanes constructed to activate use of public transportation increases, whereby there is a problem that the efficiency of exclusive bus lanes is neutralized.

Surveillance on vehicles that use exclusive bus lanes while violating laws and regulations is being intensified, and for this purpose, policemen regulate violation of exclusive bus lanes in person.

That is, policemen visually check in person the types of vehicles using exclusive bus lanes and whether the vehicles violate the condition of 6 or more persons, but there is a problem that policemen have difficulty in accurately checking the number of in-vehicle persons when they visually check vehicles being driven in exclusive bus lanes because the inside of the vehicles is not seen due to tinted windows, etc.

Further, a problem of causing a car accident or traffic congestion may be generated while a policeman stops or moves a vehicle that is running on a highway to the shoulder for regulation.

In order to prevent this problem, recently, a system that photographs the license plates of vehicles running in the exclusive bus lanes of highways through cameras installed on the highways, and discriminates and regulates only under-9-seater passenger cars through car registration check is under development.

However, it is possible to discriminate 12 or less-seater vehicles from 9 or more-seater vans that are allowed to use exclusive bus lanes through such an existing system, but there is a problem that it is difficult to figure out whether vehicles that are allowed to use exclusive bus lanes satisfy the number of in-vehicle persons because it is difficult to figure out the number of in-vehicle persons, so the regulation efficiency decreases.

SUMMARY

An object of the present disclosure is to provide support to be able to accurately and efficiently detect a vehicle violating the law about use of a high occupancy vehicle lane due to a lack of in-vehicle persons by providing support to be able to easily detect in-vehicle persons by detecting persons, who are not detected by any one camera, through another camera and detecting in-vehicle persons at different positions using a configuration that detects in-vehicle persons on the basis of images of the inside of a vehicle taken by a camera disposed diagonally to the side of a vehicle and a camera disposed orthogonally to the side of a vehicle.

A service system for detecting the number of in-vehicle persons of a vehicle in a high occupancy vehicle lane according to an embodiment of the present disclosure may include: a first camera unit disposed diagonally to a traveling direction of the vehicle and configured to transmit first image information composed of a plurality of frame images by continuously photographing the vehicle; a second camera unit disposed orthogonally to the traveling direction of the vehicle and configured to transmit second image information composed of a plurality of frame images by continuously photographing the vehicle; and a control device configured to detect an object corresponding to an in-vehicle person of the vehicle for each of a plurality of seat regions respectively corresponding to a plurality of seats, which is separated for the in-vehicle persons sit, by performing image analysis on each of the plurality of frame images constituting the first image information, and then label each of seat regions in which an object is detected with a preset seat number corresponding to the seat region, thereby creating first labeling information including one or more frame images labeled with seat numbers, configured to create second labeling information based on the second image information in the way of creating the first labeling information based on the first image information, configured to total the number of seat numbers such that seat numbers are not repeatedly totaled based on the first labeling information and the second labeling information, and calculate a final number of in-vehicle persons as the totaled number of seat numbers, and configured to determine whether the vehicle violates a law about use of a high occupancy vehicle lane based on the final number of in-vehicle persons.

As an example related to the present disclosure, the plurality of seat regions may include regions corresponding to a driver seat, a passenger seat, and a plurality of seats constituting second or more rows, respectively.

As an example related to the present disclosure, the service system may further a detector configured to create and transmit a vehicle detection signal for a vehicle passing through a surveillance target region, wherein when the control device receives the vehicle detection signal, the control device may receive the first image information from the first camera unit and may receive second image information from the second camera unit by controlling the first camera unit and the second camera unit.

As an example related to the present disclosure, the detector may be configured as any one of a loop detector that senses a vehicle using a loop coil, a radar detector that senses a vehicle using a radar signal, a laser detector that senses a vehicle based on a laser signal, and an image detector that senses a vehicle through image analysis by photographing the surveillance target region.

As an example related to the present disclosure, the service system may further include an infrared lighting unit configured to emit infrared light to the vehicle, wherein when the control device receives the vehicle detection signal, the control device may emit infrared light to the vehicle through the infrared lighting unit by controlling the infrared lighting unit.

As an example related to the present disclosure, the service system may further include a third camera unit configured to transmit third image information by photographing a license plate region of the vehicle or create and transmit plate number information based on the third image information, wherein when the final number of in-vehicle persons is less than a preset reference number of in-vehicle persons, the control device may detect the vehicle as a violating vehicle and may create and transmit violation information including plate number information corresponding to the vehicle that is obtained based on the third image information or received from the third camera unit.

As an example related to the present disclosure, the control device, for each of a plurality of frame images constituting the first image information, may: detect one or more pillar regions corresponding to pillars of a vehicle in a frame image and recognize a pillar kind of each of the detected one or more pillar regions through an image analysis algorithm in which a pillar detection reference for detecting pillar regions of a plurality of different pillar kinds is set in advance; recognize one or more seat regions in the frame image based on the detected pillar regions by performing image analysis on the frame image, using an image analysis algorithm in which an arrangement relationship between a plurality of seat regions respectively corresponding to a plurality of different preset seat numbers and pillar regions corresponding to the pillar kinds, for the respective pillar regions, is set in advance; and detect an object in each of the recognized seat regions and labels a seat region, in which an object is detected, with a seat number corresponding to the seat region; thereby creating the first labeling information including one or more frame images labeled with seat numbers, and creating the second labeling information based on the second image information in the same way as creating the first labeling information.

As an example related to the present disclosure, the control device may: total the number of seat numbers such that a same seat number of one or more seat numbers checked from the first labeling information is not repeatedly totaled, and calculate the totaled number of seat numbers as the number of in-vehicle persons; total the number of seat numbers, which do not overlap the one or more seat numbers checked from the first labeling information, of one or more seat numbers checked from the second labeling information such that a same seat number is not repeatedly totaled, and calculate the totaled number of non-repeated seat numbers as the number of additional in-vehicle persons; and calculate a final number of in-vehicle persons by adding up the calculated number of in-vehicle persons and the number of additional in-vehicle persons.

As an example related to the present disclosure, the control device may: extract feature information of an object detected in a seat region for each of seat regions in which an object is detected based on the first image information; create in-vehicle person information including the seat information of the object and a preset seat number corresponding to the seat region in which the object is detected, and match and store the feature information with the first labeling information created to correspond to the first image information; create one or more items of in-vehicle person information in the same way as creating the in-vehicle person information based on the first image information; compare feature information of one or more items of in-vehicle person information matched to the first labeling information or the second labeling information in accordance with a preset similarity algorithm, and when there is a plurality of items of in-vehicle person information in which similarity of feature information is a preset reference value or more and that has different seat numbers, determine the in-vehicle person information as repeated in-vehicle person information; set and delete the other in-vehicle person information excluding in-vehicle person information corresponding to a most repeated seat number as deletion target in-vehicle person information by comparing the plurality of items of repeated in-vehicle person information; check one or more seat numbers based on one or more items of in-vehicle person information matched to the first labeling information or the second labeling information after the deletion target in-vehicle person information is deleted; and total the number of seat numbers such that same numbers are not repeatedly totaled for the checked one or more seat numbers, and calculates the totaled number of seat numbers as the final number of in-vehicle persons.

A service method for detecting in-vehicle persons of a vehicle running on a high occupancy vehicle lane in which a control device communicates with a first camera unit disposed diagonally to a traveling direction of a vehicle running on the high occupancy vehicle lane and configured to transmit first image information composed of a plurality of frame images by continuously photographing the vehicle and a second camera unit disposed orthogonally to the traveling direction of the vehicle and configured to transmit second image information composed of a plurality of frame images by continuously photographing the vehicle, according to an embodiment of the present disclosure may include: detecting an object corresponding to an in-vehicle person of the vehicle for each of a plurality of seat regions respectively corresponding to a plurality of seats, which is separated for the in-vehicle persons sit, by performing image analysis on each of the plurality of frame images constituting the first image information, and then labeling each of seat regions in which an object is detected with a preset seat number corresponding to the seat region, thereby creating first labeling information including one or more frame images labeled with seat numbers; creating second labeling information based on the second image information in the way of creating the first labeling information based on the first image information; and totaling the number of seat numbers such that seat numbers are not repeatedly totaled based on the first labeling information and the second labeling information, and calculate a final number of in-vehicle persons as the totaled number of seat numbers, and determining whether the vehicle violates a law about use of a high occupancy vehicle lane based on the final number of in-vehicle persons, The present disclosure tracks and detects in-vehicle persons of a vehicle on the basis of images obtained by continuous photographing through a camera disposed diagonally to the traveling direction of a vehicle running on a high occupancy vehicle lane and detects in-vehicle persons by additionally using a camera disposed orthogonally to the traveling direction of a vehicle, whereby it is possible to total the number of in-vehicle persons by easily and accurately detecting all of in-vehicle persons of a vehicle using only two cameras disposed in different directions with reference to the traveling direction, and it is possible to expose and regulate vehicles of which the number of in-vehicle persons is less than a reference number of in-vehicle persons prescribed in the law about use of a high occupancy vehicle lane. Accordingly, there is an effect that it is possible to increase efficiency and economic efficiency in regulation for a high occupancy vehicle lane.

Further, the present disclosure can prevent a same in-vehicle person from being repeatedly totaled on the basis of the arrangement of seats with an object in images received from two cameras and the feature of the objects, so there is an effect that it is possible to increase accuracy and reliability in calculating the number of in-vehicle persons of a vehicle.

BRIEF DESCRIPTION OF THE DRAWINGS

The above and other objectives, features and other advantages of the present disclosure will be more clearly understood from the following detailed description when taken in conjunction with the accompanying drawings, in which.

DETAILED DESCRIPTION

Hereinafter, detailed embodiments of the present disclosure are described with reference to the drawings.

Figure 1:
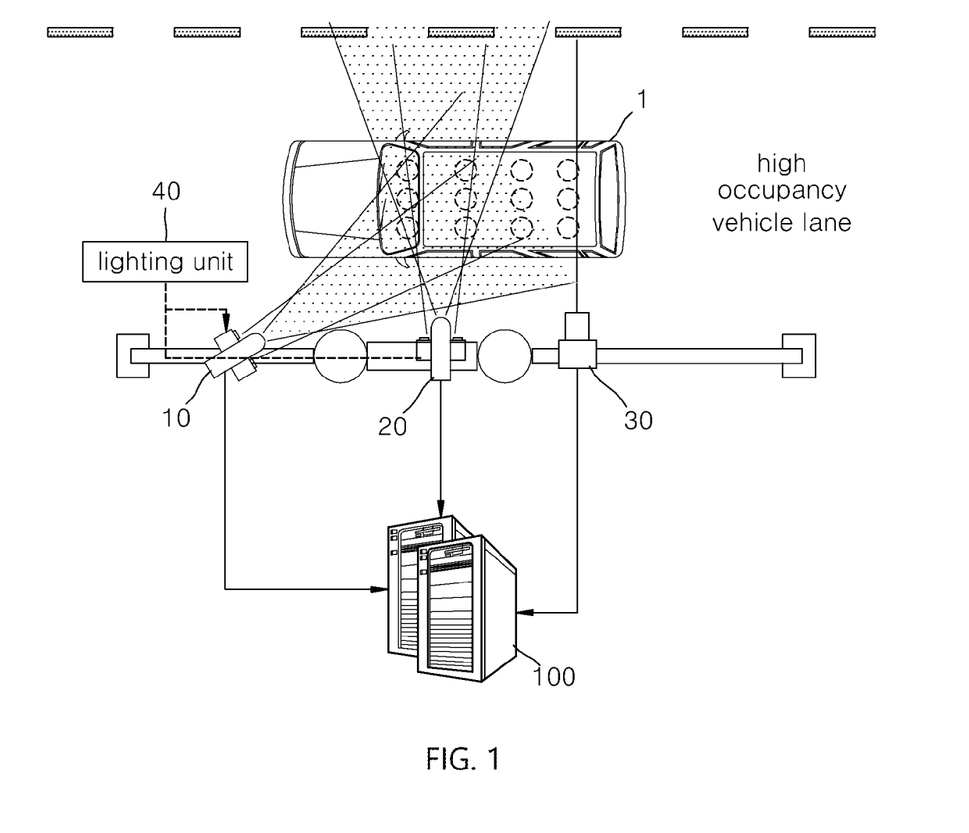
FIGS. 1 and 2 are configuration diagrams of a service system for detecting the number of in-vehicle persons of a vehicle in a high occupancy vehicle lane according to an embodiment of the present disclosure.
Figure 2:
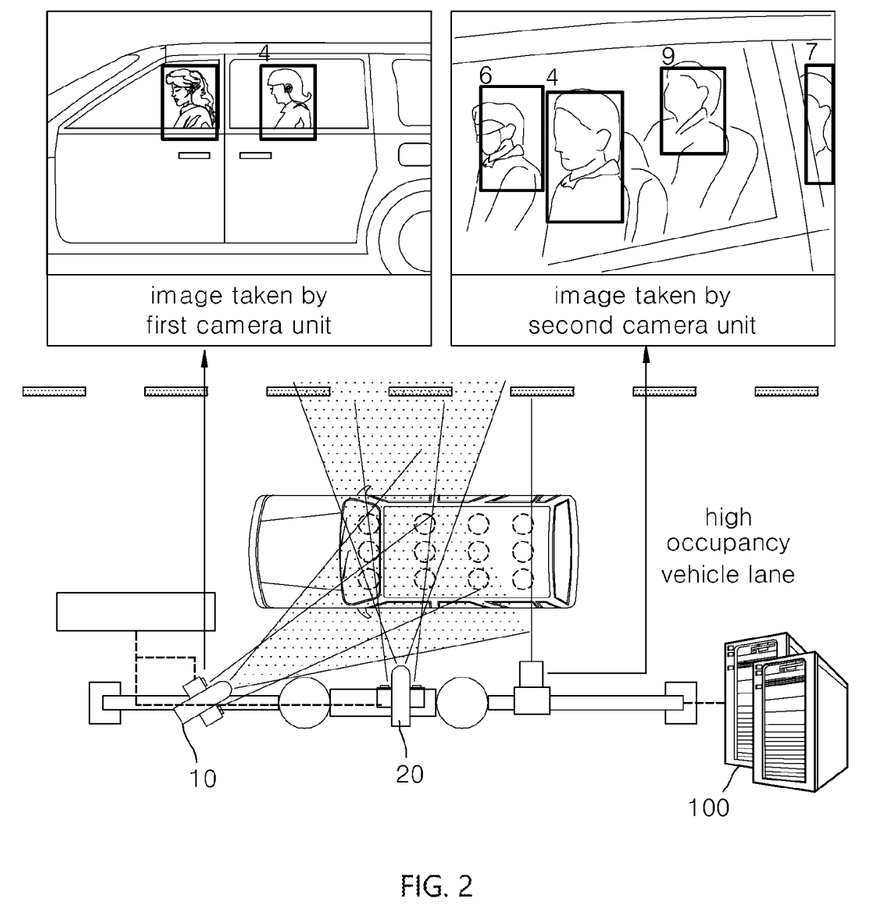

FIGS. 1 and 2 are configuration diagrams of a service system for detecting the number of in-vehicle persons of a vehicle in a high occupancy vehicle lane according to an embodiment of the present disclosure.

Before describing, a high occupancy vehicle lane stated in the present disclosure is a lane in which only vehicles with people over a prescribed number of people can run, and this high occupancy vehicle lane may be an exclusive bus lane.

An exclusive bus lane is a lane, which is provided for buses for activation of public transportation, of a plurality of lanes of a highway, and vehicles corresponding to 9 or more-seater passenger cars and vans are also prescribed as available vehicles by laws.

Further, it is prescribed by laws that 9 or more-seater passenger cars and 12 or less-seater vans of the vehicles described above that are not buses can use exclusive bus lanes only when six or more people in the vehicles.

However, vehicles, which correspond to the car types allowed to use exclusive bus lanes but need to satisfy a reference number of in-vehicle persons required to use exclusive bus lanes (legal number of in-vehicle persons (number of in-vehicle persons prescribed by laws), run with less than six persons in exclusive bus lanes in many cases, which causes traffic congestion in exclusive bus lanes. Policemen try to visually check car types and in-vehicle persons in person in order to prevent this problem, but it is difficult to check the number of in-vehicle persons of vehicles that are running. Further, the regulation method using surveillance cameras that is another regulation method only checks car types, so it is difficult to check in-vehicle persons, and accordingly, it is difficult to regulate violating vehicles that violate the laws about use of exclusive bus lanes (hereafter, violating vehicles).

Hereafter, it is exemplified that the high occupancy vehicle lane is an exclusive bus lane in the following description of the present disclosure, but the high occupancy vehicle lane is not limited thereto and the present disclosure can be applied to various high occupancy vehicle lanes.

In order to solve the problems described above, a service system according to an embodiment of the present disclosure, as shown in the figures, may include a detector 30 that creates and transmits a vehicle detection signal about a vehicle passing through a surveillance target region positioned in a high occupancy vehicle lane, a first camera unit 10 that is disposed diagonally (in a diagonal direction) (or to be diagonal) to the traveling direction of the vehicle and continuously photographs the vehicle, a second camera unit 20 that is disposed orthogonally (to be orthogonal) to the traveling direction of the vehicle and continuously photographs the vehicle, and a control device 100 that calculates the number of in-vehicle persons of the vehicle by communicating with the first camera unit 10 and the second camera unit 20 through a communication network.

In this configuration, the first camera unit 10 may be disposed to diagonally face the front of a vehicle approaching the first camera unit 10 and the second camera unit 20 may be disposed to photograph a side (for example, the left side) of a vehicle that is running.

In this configuration, the communication network described in the present disclosure may include wired/wireless communication networks, and the wireless communication network may include Wireless LAN (WLAN), Digital Living Network Alliance (DLNA), Wireless Broadband (Wibro), World Interoperability for Microwave Access (Wimax), Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), IEEE 802.16, Long Term Evolution (LTE), Long Term Evolution-Advanced (LTE-A), Wireless Mobile Broadband Service (WMBS), a 5G mobile communication service, Bluetooth, Long Range (LoRa), Radio Frequency Identification (RFID), Infrared Data Association (IrDA), Ultra Wideband (UWB), ZigBee, Near Field Communication (NFC), Ultra Sound Communication (USC), Visible Light Communication (VLC), Wi-Fi, Wi-Fi Direct, etc. Further, the wired communication network may include a Local Area Network (LAN), a wired Wide Area Network (WAN), Power Line Communication (PLC), USB communication, Ethernet, serial communication, an optical/coaxial cable, etc.

The detector 30 may be configured as any one of a loop detector that senses a vehicle using a loop coil, a radar detector that senses a vehicle using a radar signal, a laser detector that senses a vehicle on the basis of a laser signal, and an image detector that senses a vehicle through image analysis by photographing the surveillance target region.

For example, when the detector 30 is configured as a laser detector, the detector 30 can set the surveillance target region on a road on which the vehicle runs on the basis of a laser signal, and when a vehicle running toward the surveillance target region passes through the surveillance target region, the detector 30 can detect the vehicle through a laser signal and create and transmit a vehicle detection signal, which is a trigger signal accompanying detection of the vehicle, to the control device 100.

Further, the first camera unit 10 may be disposed diagonally to the traveling direction of the vehicle adjacent to the high occupancy vehicle lane to photograph the vehicle, and can create a plurality of frame images by continuously photographing the vehicle and transmit the plurality of created frame images to the control device 100.

In this case, every time the first camera unit 10 crates each of a plurality of frame images through continuous photographing, the first camera unit 10 can transmit the frame image to the control device 100 or can create and transmit first image information including a plurality of frame images created by the first camera unit 10 to the control device 100.

Further, the second camera unit 20 may be disposed diagonally to the traveling direction of the vehicle adjacent to the high occupancy vehicle lane to photograph a side (for example, the left side) of the vehicle, and can create a plurality of frame images by continuously photographing the vehicle and transmit the plurality frame images to the control device 100.

In this case, every time the second camera unit 20 crates each of a plurality of frame images through continuous photographing, the second camera unit 20 can transmit the frame image to the control device 100 or can create and transmit second image information including a plurality of frame images created by the second camera unit 20 to the control device 100.

Further, in addition to the configuration described above, the service system according to the present disclosure may further include a third camera unit (not shown) that photographs the license plate of a vehicle, and the third camera unit can provide an image (or third image information) obtained by photographing the license plate of the vehicle to the control device 100.

In this case, the third camera unit can perform image analysis by itself, and accordingly, the third camera unit can also create an image by photographing the license plate of the vehicle, create plate number information by recognizing the plate number, and transmit the plate number information to the control device 100.

In this configuration, the first camera unit 10 may create and transmit third image information by photographing the license plate of the vehicle to the control device 100 or create and transmit the plate number information to the control device 100.

Further, in addition to the configuration described above, the service system according to the present disclosure may further include an infrared lighting unit 40 that emits infrared light to the vehicle.

In this case, the infrared lighting unit 40 may include a plurality of infrared lamps. A first infrared lamp of the plurality of infrared lamps may be disposed diagonally to the traveling direction of a vehicle to correspond to the first camera unit 10 and may emit infrared light to a vehicle when the first camera unit 10 photographs the vehicle, and a second infrared lamp of the plurality of infrared lamps may be disposed orthogonally to the traveling direction of a vehicle to correspond to the second camera unit 20 and may emit infrared light to a vehicle when the second camera unit 20 photographs the vehicle.

Further, the control device 100 recognizes a plurality of seat regions respectively corresponding to a plurality of seats configured in a vehicle on the basis of image information that is received from the first camera unit 10 and the second camera unit 20, and counts the number of in-vehicle persons while detecting an object corresponding to an in-vehicle person sitting in a seat for each of the plurality of seat regions, thereby being able to calculate the final number of in-vehicle persons and detect whether the vehicle violates a high occupancy vehicle lane on the basis of the final number of in-vehicle persons, which is described hereafter in detail with reference to the drawings on the basis of the configuration described above.

Figure 3:
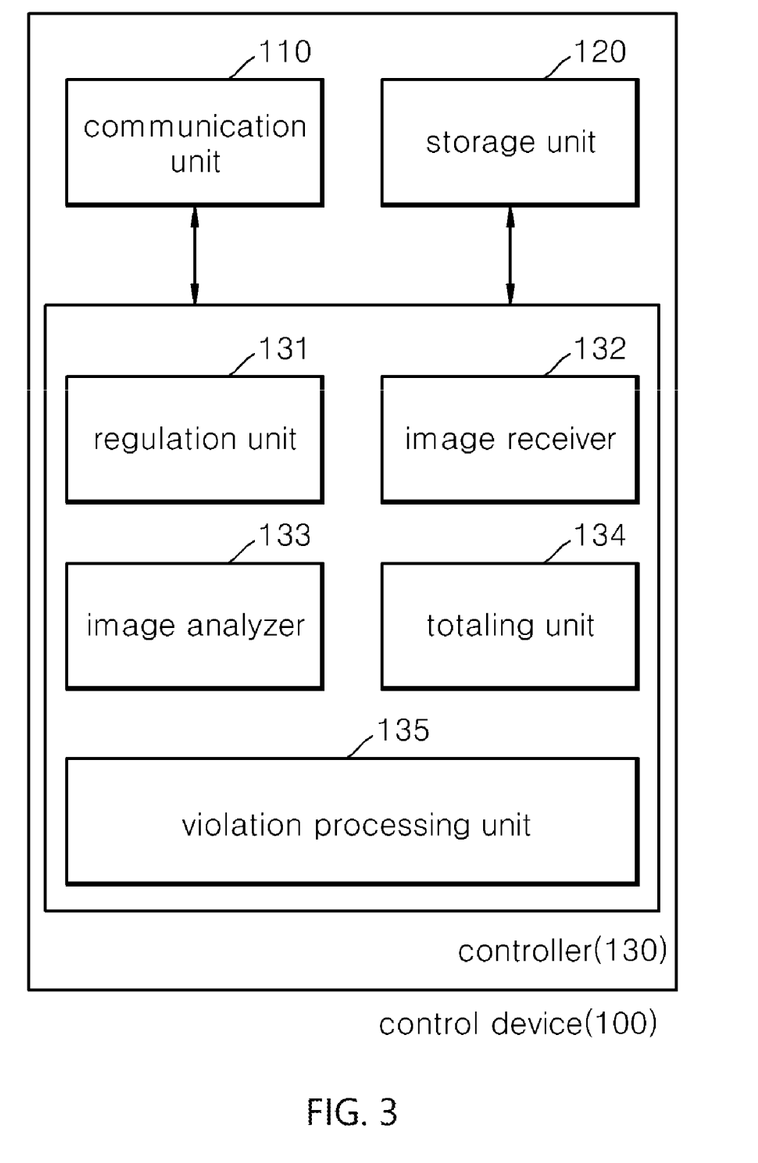
FIG. 3 is a detailed configuration diagram of a control device according to an embodiment of the present disclosure.

First, the detailed configuration of the control device 100 is described with reference to FIG. 3. As shown in the figure, the control device 100 may include a communication unit 110, a storage unit 120, a controller 130, etc., but is not limited thereto and may further include various components.

In this configuration, the communication unit 110 can communicate with the detector 30, the infrared lighting unit 40, and the first camera unit 10 to the third camera unit through a communication network.

Further, the storage unit 120 can store various items of information, may be configured in various types such as a Hard Disk Drive (HDD) and a Solid State Drive (SSD), and may include one or more DBs.

Further, the controller 130 may perform a general control function of the control device 100 and may include a RAM, a ROM, a CPU, a GPU, and buses, and the RAM, the ROM, the CPU, the GPU, etc. may be connected through the buses.

Further, the communication unit 110 and the storage unit 120 may be included in the controller 130.

Further, the controller 130 may include a regulation unit 131, an image receiver 132, an image analyzer 133, a totaling unit 134, a violation processing unit 135, etc., and at least one of the components constituting the controller 130 may be included in another one.

In this case, a plurality of components constituting the controller 130 may be implemented by a processor that can process data, etc., and may be separately implemented by different processors or may be functionally separated in one processor.

Further, at least one of the components of the controller 130 can communicate with the detector 30, the infrared lighting unit 40, and the first to third camera units through a communication unit 110, and a communication component through the communication unit 110 is omitted in the following description.

Figure 4:
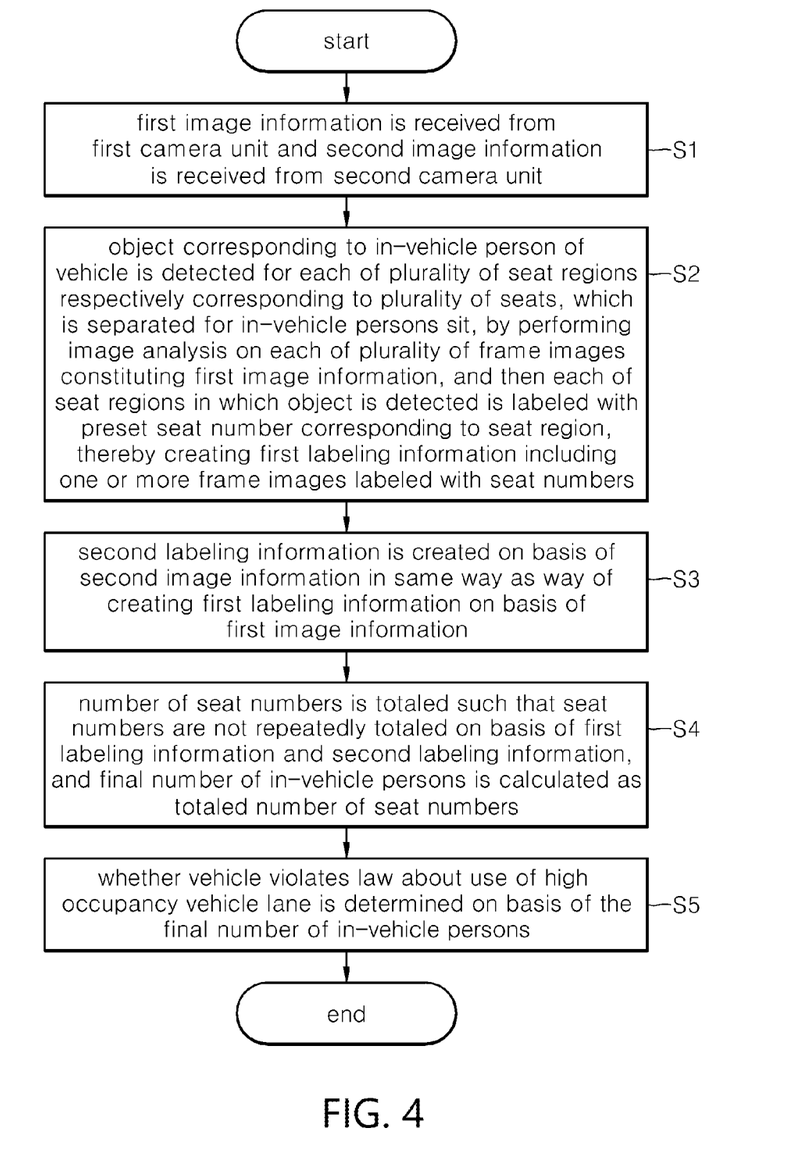
FIG. 4 is an operation flowchart of the control device according to an embodiment of the present disclosure.

Hereafter, a detailed operation configuration of the control device 100 is described with reference to the operation flowchart of the control device 100 of FIG. 4.

First, the regulation unit 131 can transmit a control signal for photographing to the first camera unit 10 and the second camera unit 20 when receiving a vehicle detection signal accompanying detection of a vehicle running on a high occupancy vehicle lane from the detector 30.

Accordingly, the first camera unit 10 receiving the control signal can transmit a plurality of frame images created by continuously photographing the vehicle or first image information to the control device 100.

Further, the second camera unit 20 receiving the control signal can transmit a plurality of frame images created by continuously photographing the vehicle or second image information to the control device 100.

In this case, the regulation unit 131 can transmit a control signal to the third camera when receiving the vehicle detection signal.

Accordingly, the third camera unit receiving the control signal can create and transmit third image information by photographing a license plate region of the vehicle to the control device 100 or can recognize the license plate region of a vehicle from the third image information, recognize the plate number in the license plate region of the vehicle, and then create and transmit plate number information including the recognized plate number to the control device 100.

Alternatively, the first camera unit 10 receiving the control signal may create and transmit third image information by photographing the license plate region of the vehicle to the control device 100 or may create plate number information by recognizing a plate number on the basis of the third image information and then transmit the plate number information to the control device 100.

Further, the regulation unit 131 can transmit a light control signal to the infrared lighting unit 40 when receiving the vehicle detection signal, and the infrared lighting unit 40 receiving the light control signal can support the first camera unit 10 and the second camera unit 20 to be able to easily photograph the inside of a vehicle running on the high occupancy vehicle lane without being influenced by reflection by windows or coating of the windows of the vehicle by emitting infrared light to the vehicle.

Alternatively, the first camera unit 10 or the second camera unit 20 may be configured as a Near Infrared (NIR) camera, and accordingly, it may be configured to be able to easily photograph the inside of a vehicle even without the infrared lighting unit 40.

Further, the image receiver 132 can receive an image obtained by photographing the vehicle from the first camera unit 10 and can create first image information on the basis of a plurality of frame images constituting the image received from the first camera unit 10 or can receive the first image information from the first camera unit 10 (S1).

In this case, the first image information may include first camera identification information corresponding to the first camera.

Further, the image receiver 132 can receive an image obtained by photographing the vehicle from the second camera unit 20 and can create second image information on the basis of a plurality of frame images constituting the image received from the second camera unit 20 or can receive the second image information from the second camera unit 20 (S1).

In this case, the second image information may include second camera identification information corresponding to the second camera unit 20.

Further, the image receiver 132 can provide the image analyzer 133 with the first image information created by diagonally photographing the vehicle.

Accordingly, the image analyzer 133 can recognize a plurality of seat regions respectively corresponding to a plurality of seats separated for in-vehicle persons to sit therein by receiving the first image information and performing image analysis on each of a plurality of frame images included in the first image information, can detect objects corresponding to the in-vehicle persons of the vehicle from the frame images through image analysis, and can recognize seat regions having objects of the plurality of seat regions.

In this case, the plurality of seat regions may include regions respectively corresponding to a driver seat, one or more passenger seats, and a plurality of seats constituting two or more rows.

To this end, the image analyzer 133 can recognize one or more pillar regions corresponding to the pillars of a vehicle from frame images and can recognize a plurality of seat regions on the basis of the one or more pillar regions.

Figure 5:
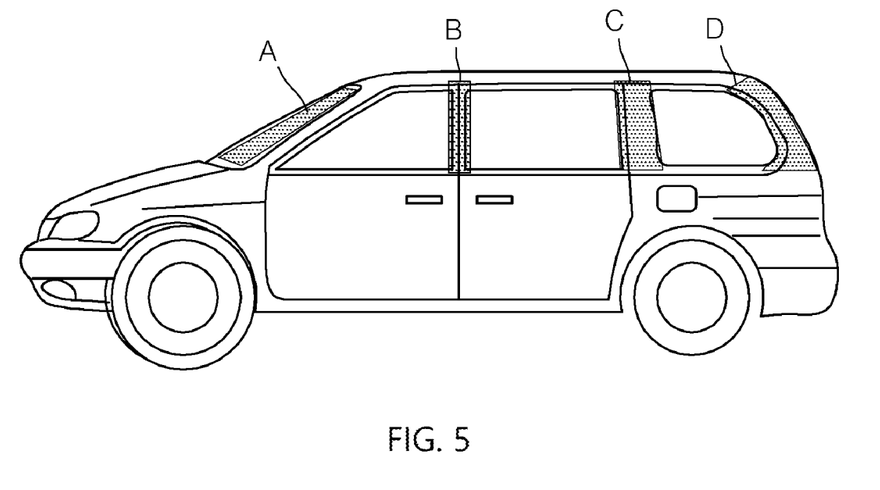
FIGS. 5 to 8 are exemplary operation diagrams of the service system for detecting the number of in-vehicle persons of a vehicle in a high occupancy vehicle lane according to an embodiment of the present disclosure.
Figure 6:
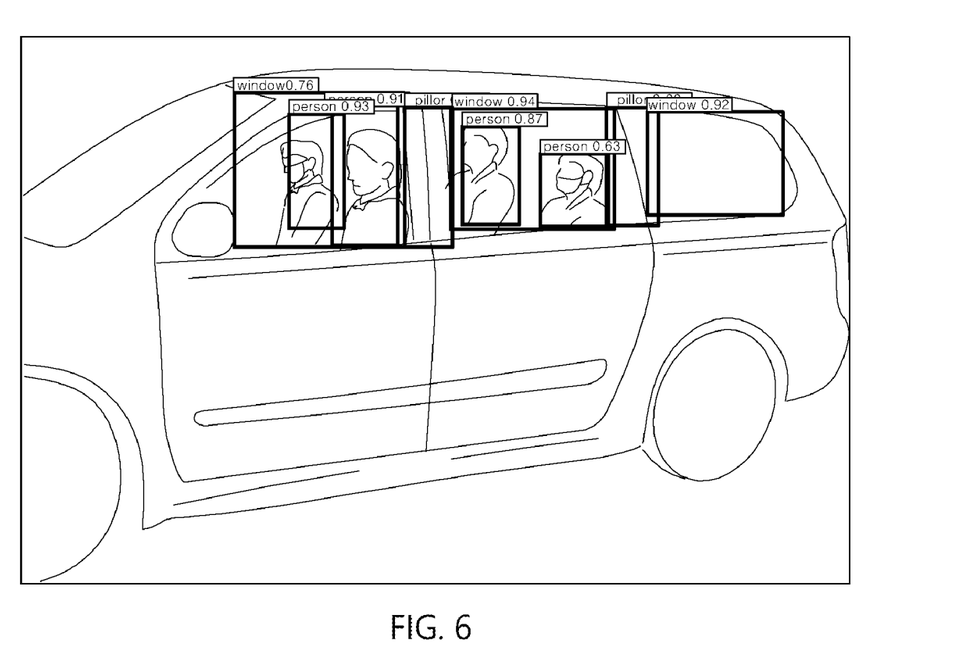

For example, as shown in FIGS. 5 and 6, the image analyzer 133 can detect one or more pillar regions of a vehicle from frame images and simultaneously recognize the pillar kind in each of the detected one or more pillar regions through an image analysis algorithm having a preset pillar detection reference for detecting (recognizing) pillar regions for a plurality of different pillar kinds respectively corresponding to an A pillar, a B pillar, a C pillar, a D pillar, etc.

Further, in the image analyzer 133, seat setting information, in which an arrangement relationship (relative position relationship) between a plurality of seat regions respectively corresponding to a plurality of seats configured in a vehicle according to arrangement regions (or arrangement positions) of pillars respectively corresponding to the pillar kinds for the plurality of pillar kinds, may be set in advance.

Accordingly, the image analyzer 133 can detect one or more pillar regions from the frame images through image analysis, recognize the pillar kind of each of the detected one or more pillar regions, and recognize one or more seat regions from the frame images on the basis of the detected pillar regions in accordance with the arrangement order of the pillar kinds according to the seat setting information and the arrangement relationship corresponding to the recognized pillar kinds.

In this case, the seat setting information may be an image analysis algorithm in which the arrangement relationship between a plurality of seat regions respectively corresponding to a plurality of preset different seat numbers and pillar regions corresponding to pillar regions is set in advance for each of the pillar kinds, and accordingly, the image analyzer 133 can recognize (detect) seat regions and simultaneously recognize (detect) the seat numbers of the recognized seat regions through image analysis using the image analysis algorithm in which the seat setting information is reflected in the frame images.

In this case, the plurality of different seat numbers may also be set in advance in the seat setting information.

For example, when the image analyzer 133 detects an A pillar region corresponding to an A pillar of a vehicle from a first frame image through image analysis, the image analyzer 133 can recognize one or more (or a plurality of) seat regions that are regions occupied in the frame image respectively by one or more seats (or a plurality of seats) constituting a first row on the basis of the A pillar in the image frame through image analysis using the seat setting information, and similarly, for second or more rear rows, can recognize, from the frame image, one or more seat regions (or a plurality of seat regions) respectively corresponding to one or more seats (or a plurality of seats) constituting the rear rows on the basis of the A pillar region.

That is, the image analyzer 133 can recognize one or more seat regions by recognizing relative positions of one or more seat regions corresponding to a first row in the first frame image in accordance with the seat setting information on the basis of the position of an A pillar region detected from the first frame image, and can recognize seat regions, in which objects are detected, by detecting objects in the one or more seat regions.

In this case, the image analyzer 133 may detect a pillar region, detect a window region adjacent to the pillar region, and detect (recognize) a plurality of seat regions on the basis of the window region through image analysis.

Figure 7:
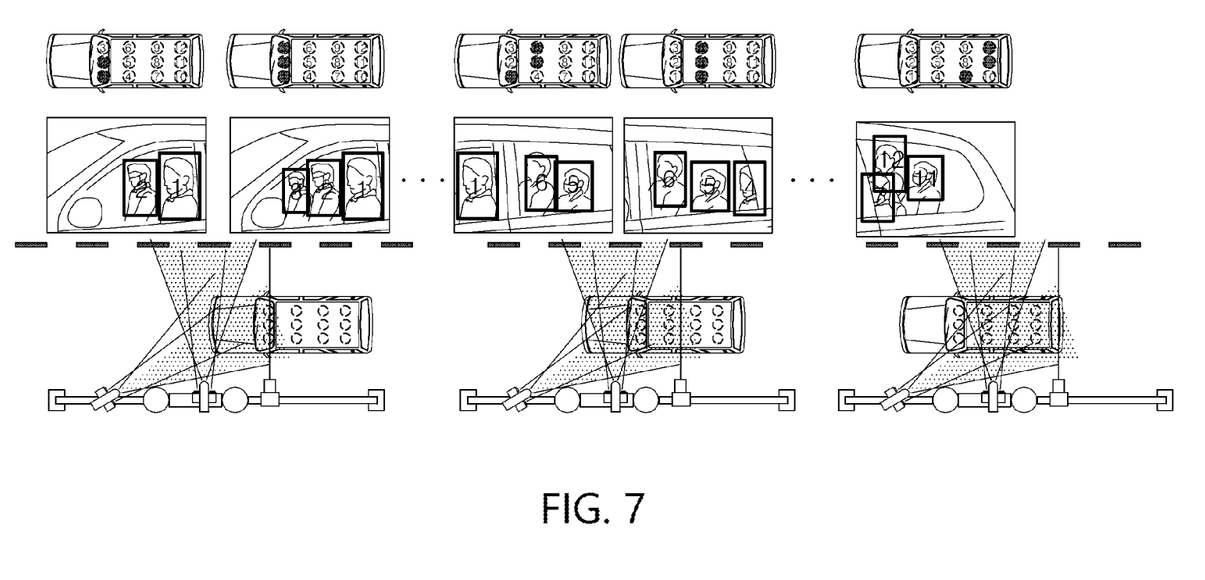

Further, as shown in FIG. 7, the image analysis 133 can recognize a seat number corresponding to a seat region on the basis of the seat setting information for each of seat regions in which objects are detected of one or more seat regions corresponding to the first row and then label the seat regions, in which corresponding objects are detected, with the recognized seat numbers, and accordingly, can create a first frame image with labeled seat numbers.

Further, when the image analyzer 133 detects an A pillar region corresponding to an A pillar (A pillar kind) and a B pillar region corresponding to a B pillar (B pillar kind) in a second frame image included in the first image information and following the first frame image, the image analyzer 133 recognizes (detects) the position (coordinates) of at least one seat region of on 3 or more seat regions corresponding to a first row and one or more seat regions corresponding to a second or more row in the second frame image in accordance with the seat setting information on the basis of the positions (coordinates) of the A pillar region and the B pillar region in the second frame image through image analysis, detects objects in one or more seat regions constituting the recognized first row or the rear row, labels each of seat regions, in which an object is detected, of one or more seat regions corresponding to the first row with a seat number corresponding to the corresponding seat region, and labels each of seat regions, in which an object is detected, of one or more seat regions corresponding to the recognized rear row with a seat number corresponding to the corresponding seat region, thereby being able to create a second image in which each seat region having an object is labeled with a seat number.

Accordingly, the image analyzer 133 performs labeling described above on each of a plurality of frame images included in the first image information, thereby being able to create and store first labeling information including one or more labeled frame images in the storage unit 120 (S2).

In this case, the image analyzer 133 can exclude a frame image, which is not labeled with a seat number because an object corresponding to an in-vehicle person is not detected, not to be included in the first labeling information.

Further, the image analyzer 133 can extract feature information of an object existing in the labeled seat region (positioned in the labeled seat region) for each seat region labeled with a seat number in the labeled frame image through image analysis on the seat region, can create in-vehicle person information by matching the seat number of the seat region corresponding to the extracted feature information and the extracted feature information, for the respective feature information, and can match and store the in-vehicle person information with the first labeling information in the storage unit 120.

In this case, the feature information may include a size, a color, a direction, a boundary, a peculiar point, a histogram distribution, etc.

Further, the in-vehicle person information may include feature information of an object and a seat number corresponding to the object.

Further, the image analyzer 133 can create in-vehicle person information corresponding to a seat region, in which an object is detected, in each of the labeled frame images included in the first labeling information, as described above.

In the configuration described above, the image analyzer 133 can receive plate number information corresponding to a vehicle photographed by the first camera unit 10 from the third camera unit or the first camera unit 10 in linkage with the image receiver 132, and can match and store the first labeling information with the plate number information while storing the plate number information in the storage unit 120.

Further, in the configuration described above, one or more image analysis algorithms may be set in the image analyzer 133, as an example of this image analysis algorithm, various image analysis algorithms such as object recognition (object detection), segmentation, and skeleton analysis may be applied.

In addition, the image analysis algorithm may be configured as a deep learning-based learning model, and the learning model may be trained to detect pillar regions and seat regions in an input frame image and recognize the seat numbers of the detected seat regions.

In this case, the learning model may be configured as a deep learning algorithm and the deep learning algorithm may be configured as one or more neural network models.

Further, the neural network model (or neural network) described herein may be composed of an input layer, one or more hidden layers, and an output layer, and various kinds of neural networks such as a Deep Neural Network (DNN), a Recurrent Neural Network (RNN), a Convolutional Neural Network (CNN), and a Support Vector Machine (SVM) may be applied to the neural network model.

Further, the image receiver 132 is disposed orthogonally to the traveling direction of the vehicle and can provide the image analyzer 133 with second information created on the basis of images received from the second camera unit 20 continuously photographing the vehicle or second image information received from the second camera unit 20.

Further, the image analyzer 133, similar to the process of creating first labeling information on the basis of the first image information, can create second labeling information on the basis of the second image information and match and store the second labeling information with the first labeling information or the plate number information in the storage unit 120 (S3).

For example, the image analyzer 133 can create second labeling information including one or more frame images labeled with seat numbers by performing a process that, for each of a plurality of frame images constituting the second image information, detects one or more pillar regions corresponding to pillars of a vehicle in a frame image and recognizes a pillar kind of each of the detected one or more pillar regions through an image analysis algorithm in which a pillar detection reference for detecting pillar regions of a plurality of different pillar kinds is set in advance; recognizes one or more seat regions in the frame image on the basis of the detected pillar regions by performing image analysis on the frame image, using an image analysis algorithm in which the arrangement relationship between a plurality of seat regions respectively corresponding to a plurality of different preset seat numbers and pillar regions corresponding to the pillar kinds, for the respective pillar regions, is set in advance; and detects an object in each of the recognized seat regions and labels a seat region, in which an object is detected, with a seat number corresponding to the seat region.

In this case, the image analyzer 133 can exclude a frame image, which is not labeled with a seat number because an object corresponding to an in-vehicle person is not detected, not to be included in the second labeling information.

Figure 8:
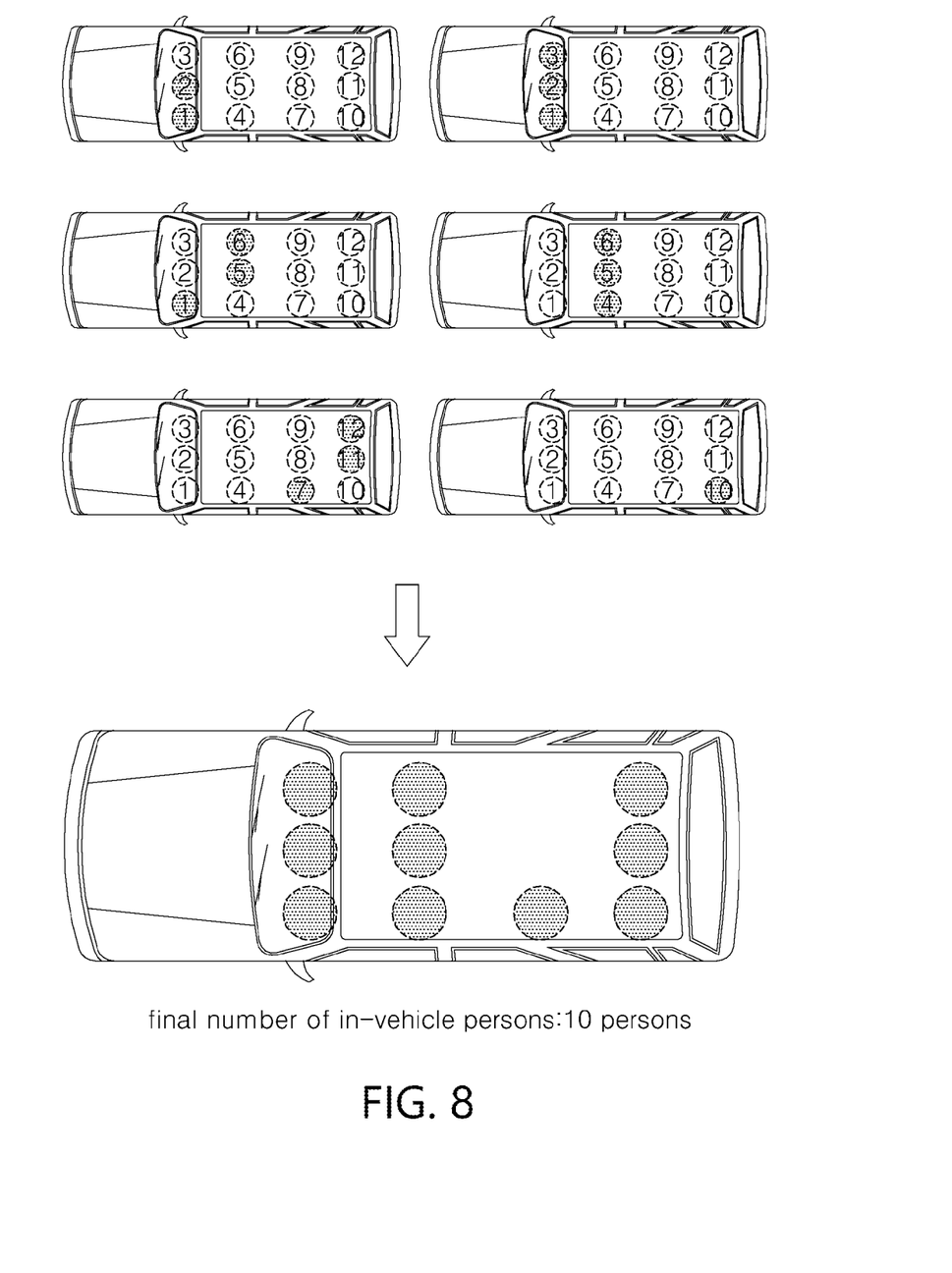

Meanwhile, as shown in FIGS. 7 and 8, the totaling unit 134 can check the seat numbers of labeled seat regions on the basis of the first labeling information and the second labeling information and can total the final number of in-vehicle persons of the vehicle on the basis of the checked one or more seat numbers (S4).

For example, the totaling unit 134 can check one or more seat numbers labeled on seat regions in each of one or more labeled frame images included in the first labeling information and can check one or more seat numbers labeled on seat regions in each of one or more labeled frame images included in the second labeling information.

Further, the totaling unit 134 totals the number of seat numbers such that the same seat number of one or more seat numbers checked from the first labeling information is not repeatedly totaled, thereby being able to calculate (set) the totaled number of seat numbers as the number of in-vehicle persons. Further, the totaling unit 134 totals the number of seat numbers, which do not overlap the one or more seat numbers checked from the first labeling information, of one or more seat numbers checked from the second labeling information such that the same seat number is not repeatedly totaled, thereby being able to calculate (set) the totaled number of non-repeated seat numbers as the number of additional in-vehicle persons.

For example, when a first labeled frame image (hereafter, first image), a second labeled frame image (hereafter, second image), a third labeled frame image (hereafter, third image), a fourth labeled frame image (hereafter, fourth image), and a fifth labeled frame image (hereafter, fifth image) are included in the first labeling information and when the first image is labeled with (includes) seat numbers 1 and 2, the second image is labeled with (includes) seat numbers 1, 2, and 3, the third image is labeled with (includes) seat numbers 1, 5, and 6, the fourth image is labeled with (includes) seat numbers 4, and 6, and the fifth image is labeled with (includes) seat numbers 7, 11, and 12, the totaling unit 134 can check the seat numbers 1, 2, 3, 4, 5, 6, 7, 11, and 12 such that same numbers are not repeatedly totaled for the first labeling information, can total the number of seat numbers as 9, and can calculate (total) the number of in-vehicle persons for the first labeling information as 9 according to the number of seat numbers.

In this case, the totaling unit 134 can total the number of seat numbers such that same numbers are not repeatedly totaled in the way of totaling the seat numbers 1 and 2 as totaling targets for the first image, totaling only the seat number 3 as a totaling target except the seat numbers 1 and 2 in the second image including seat numbers the same as the seat numbers 1 and 2 included in the first image, totaling only the seat numbers 5 and 6 at totaling targets except the seat number 1 in the third image including a seat number the same as the seat number 1 included in the first and second images, totaling only the seat number 4 as a totaling target in the fourth image including seat numbers the same as the seat numbers 5 and 6 included in the third image, and totaling, as totaling targets, all of the seat numbers 7, 11, and 12 included in the fifth image not having a seat number overlapping the first to fourth images.

Further, when a sixth labeling frame image (hereafter, sixth image), a seventh labeling frame image (hereafter, seventh image), an eighth labeling frame image (hereafter, eighth image), and a ninth labeling frame image (hereafter, ninth image) are included in the second labeling information and when seat numbers 1 and 2 are included in the sixth image, seat numbers 4 and 5 are included in the seventh image, a seat number 7 is included in the eighth image, and a seat number 10 is included in the ninth image, the totaling unit 134 checks seat numbers 1, 2, 4, 5, 7, and 10 for the second labeling information and determines only the seat number 10 as a totaling target except the seat numbers 1, 2, 4, 5, and 7 that are the same as the seat numbers included in the first labeling information, thereby being able to total the number of seat numbers corresponding to the second labeling information as 1 and calculate (total) the number of additional in-vehicle persons as 1 in accordance with the number of seat numbers totaled to correspond to the second labeling information.

Further, the totaling unit 134 can calculate the final number of in-vehicle persons by adding up the number of in-vehicle persons and the number of additional in-vehicle persons and can match and store the final number of in-vehicle persons with the plate number information matched to the first labeling information in the storage unit 120.

For example, the totaling unit 134, as described above, can calculate the final number of in-vehicle persons as 10 by adding up 9 persons that is the number of in-vehicle persons calculated for the first labeling information and 1 person that is the number of in-vehicle persons calculated for the second labeling information, and can determine that persons are in the vehicle.

Further, the violation processing unit 135 determines whether the final number of in-vehicle persons matched to the plate number information is less than (or is or less than) a reference number of in-vehicle persons for using the high occupancy vehicle lane, thereby being able to determine whether the vehicle violates the law about use of the high occupancy vehicle lane. Further, when the final number of in-vehicle persons is less than (or is or less than) the reference number of in-vehicle persons, the violation processing unit 135 can determine that the vehicle violated the law about use of the high occupancy vehicle lane and can create violation information including the plate number information (S5).

Further, the violation processing unit 135 can store the violation information in the storage unit 120 or transmit the violation information to a preset external server.

Meanwhile, in the configuration described above, a case, in which a seat region is detected wrong due to movement of an in-vehicle person of a vehicle such as moving to another seat or inclining the upper body when the vehicle is being photographed through the first camera unit and the second camera unit 20, a seat region without an in-vehicle person is labeled with a seat number, and accordingly an in-vehicle person is repeatedly added, may occur, and a configuration for preventing this problem is described in detail.

As described above, the image analyzer 133, for seat regions in which an object is detected, can extract feature information of the objects detected in the seat regions on the basis of the first image information, create in-vehicle person information including the seat numbers of the seat regions, in which the objects are detected, and the feature information of the objects, and match and store the in-vehicle person information with first labeling information created to correspond to the first image information in the storage unit 120.

Further, for the second image information, the image analyzer 133 can match and store one or more items of in-vehicle person information with the second labeling information created to correspond to the second image information in the storage unit 120 in the same way as creating in-vehicle persons corresponding to the first image information.

That is, the image analyzer 133, for seat regions in which an object is detected, can extract feature information of the objects detected in the seat regions on the basis of the second image information, create in-vehicle person information including the seat numbers of the seat regions, in which the objects are detected, and the feature information of the objects, and match and store the in-vehicle person information with second labeling information created to correspond to the second image information or the first labeling information in the storage unit 120.

Accordingly, the totaling unit 134 compares feature information of one or more items of in-vehicle person information matched to the first labeling information or the second labeling information in the storage unit 120 in accordance with a preset similarity algorithm, and when the similarity of the items of feature information is a preset reference value or more and there is a plurality of items of in-vehicle person information having different seat numbers, the totaling unit 134 determines that the in-vehicle person information is repeated in-vehicle person information. Further, the totaling unit 134 compares the plurality of items of repeated in-vehicle person information, sets the other in-vehicle person information excluding in-vehicle person information corresponding to a most repeated seat number as deletion target in-vehicle person information, and deletes the deletion target in-vehicle person information from the storage unit 120. Accordingly, it is possible to prevent a same object from being repeatedly totaled.

Further, the totaling unit 134 can check one or more seat numbers on the basis of one or more items of in-vehicle person information matched to the first labeling information or the second labeling information after the deletion target in-vehicle person information is deleted, total the number of seat numbers for the checked one or more seat numbers such that a same seat number is not repeatedly totaled, calculate the totaled number of seat numbers as a final number of in-vehicle persons, and match and store the final number of in-vehicle persons with the plate number information corresponding to the first labeling information or the second labeling information in the storage unit 120.

Further, when the final number of in-vehicle persons matched to the plate number information is less than the reference number of in-vehicle persons for using the high occupancy vehicle lane, the violation processing unit 135, as described above, can determine that the vehicle corresponding to the plate number information violated the law about use of the high occupancy vehicle lane, and can create and transmit violation information including the plate number information to the external server.

As described above, the present disclosure tracks and detects in-vehicle persons of a vehicle on the basis of images obtained by continuous photographing through a camera disposed diagonally to the traveling direction of a vehicle running on a high occupancy vehicle lane and detects in-vehicle persons by additionally using a camera disposed orthogonally to the traveling direction of a vehicle, whereby it is possible to total the number of in-vehicle persons by easily and accurately detecting all of in-vehicle persons of a vehicle using only two cameras disposed in different directions with reference to the traveling direction, and it is possible to expose and regulate vehicles of which the number of in-vehicle persons is less than a reference number of in-vehicle persons prescribed in the law about use of a high occupancy vehicle lane. Accordingly, it is possible to increase efficiency and economic efficiency in regulation for a high occupancy vehicle lane.

That is, according to the present disclosure, when some of in-vehicle persons are blocked by the vehicle while the in-vehicle persons are photographed through any one camera of the two cameras, it is possible to photograph the blocked in-vehicle persons through the other camera, so it is possible to easily photograph all of the in-vehicle persons of the vehicle and accurately calculate the number of in-vehicle persons of the vehicle.

Further, the present disclosure can prevent a same in-vehicle person from being repeatedly totaled on the basis of the arrangement of seats with an object in images received from two cameras and the feature of the objects, so it is possible to increase accuracy and reliability in calculating the number of in-vehicle persons of a vehicle.

The components described in the embodiments of the present disclosure may be achieved by one or more common computers or computers for specific purposes, such as a storage, for example, a memory; hardware such as a processor, a control device, an ALU (arithmetic logic unit), a digital signal processor, a microcomputer, an FPGA (Field Programmable Gate Array), a PLU (programmable logic unit), and a microprocessor; and any devices that can execute software including a set of instructions and a combination thereof or instructions and can give responses.

The above description may be changed and modified by those skilled in the art without departing from the fundamental characteristics of the present disclosure. Accordingly, the embodiments described herein are provided merely not to limit, but to explain the spirit of the present disclosure, and the spirit of the present disclosure is not limited by the embodiments. The protective range of the present disclosure should be construed by the following claims and the scope and spirit of the present disclosure should be construed as being included in the patent right of the present disclosure.

DESCRIPTION OF REFERENCE NUMERALS

10: First camera unit
20: Second camera unit
30: Detector
40: Infrared lighting unit
100: Control device
110: Communication unit
120: Storage unit
130: Controller
131: Regulation unit
132: Image receiver
133: Image analyzer
134: Totaling unit
135: Violation processing unit

What is claimed is:

1. A service system for detecting the number of in-vehicle persons of a vehicle in a high occupancy vehicle lane, the service system comprising:
a first camera unit disposed diagonally to a traveling direction of the vehicle and configured to transmit first image information composed of a plurality of frame images by continuously photographing the vehicle;
a second camera unit disposed orthogonally to the traveling direction of the vehicle and configured to transmit second image information composed of a plurality of frame images by continuously photographing the vehicle; and a control device configured to detect an object corresponding to an in-vehicle person of the vehicle for each of a plurality of seat regions respectively corresponding to a plurality of seats, which is separated for the in-vehicle persons sit, by performing image analysis on each of the plurality of frame images constituting the first image information, and then label each of seat regions in which an object is detected with a preset seat number corresponding to the seat region, thereby creating first labeling information including one or more frame images labeled with seat numbers, configured to create second labeling information based on the second image information in the way of creating the first labeling information based on the first image information, configured to total the number of seat numbers such that seat numbers are not repeatedly totaled based on the first labeling information and the second labeling information, and calculate a final number of in-vehicle persons as the totaled number of seat numbers, and configured to determine whether the vehicle violates a law about use of a high occupancy vehicle lane based on the final number of in-vehicle persons, wherein the control device:

extracts feature information of an object detected in a seat region for each of seat regions in which an object is detected based on the first image information;

creates in-vehicle person information including the seat information of the object and a preset seat number corresponding to the seat region in which the object is detected, and matches and stores the feature information with the first labeling information created to correspond to the first image information;

creates one or more items of in-vehicle person information in the same way as creating the in-vehicle person information based on the first image information, and matches and stores the one or more items of in-vehicle person information with the second labeling information;

compares feature information of one or more items of in-vehicle person information matched to the first labeling information or the second labeling information in accordance with a preset similarity algorithm, and when there is a plurality of items of in-vehicle person information in which similarity of feature information is a preset reference value or more and that has different seat numbers, determines the in-vehicle person information as repeated in-vehicle person information;

sets and deletes the other in-vehicle person information excluding in-vehicle person information corresponding to a most repeated seat number as deletion target in-vehicle person information by comparing the plurality of items of repeated in-vehicle person information;

checks one or more seat numbers based on one or more items of in-vehicle person information matched to the first labeling information or the second labeling information after the deletion target in-vehicle person information is deleted; and totals the number of seat numbers such that same numbers are not repeatedly totaled for the checked one or more seat numbers, and calculates the totaled number of seat numbers as the final number of in-vehicle persons.

2. The service system of claim 1, wherein the plurality of seat regions includes regions corresponding to a driver seat, a passenger seat, and a plurality of seats constituting second or more rows, respectively.

3. The service system of claim 1, further comprising a detector configured to create and transmit a vehicle detection signal for a vehicle passing through a surveillance target region, wherein when the control device receives the vehicle detection signal, the control device receives the first image information from the first camera unit and receives second image information from the second camera unit by controlling the first camera unit and the second camera unit.

4. The service system of claim 3, wherein the detector is configured as any one of a loop detector that senses a vehicle using a loop coil, a radar detector that senses a vehicle using a radar signal, a laser detector that senses a vehicle based on a laser signal, and an image detector that senses a vehicle through image analysis by photographing the surveillance target region.

5. The service system of claim 3, further comprising an infrared lighting unit configured to emit infrared light to the vehicle, wherein when the control device receives the vehicle detection signal, the control device emits infrared light to the vehicle through the infrared lighting unit by controlling the infrared lighting unit.

6. The service system of claim 1, further comprising a third camera unit configured to transmit third image information by photographing a license plate region of the vehicle or create and transmit plate number information based on the third image information, wherein when the final number of in-vehicle persons is less than a preset reference number of in-vehicle persons, the control device detects the vehicle as a violating vehicle and creates and transmits violation information including plate number information corresponding to the vehicle that is obtained based on the third image information or received from the third camera unit.

7. The service system of claim 1, wherein the control device, for each of a plurality of frame images constituting the first image information:

detects one or more pillar regions corresponding to pillars of a vehicle in a frame image and recognizes a pillar kind of each of the detected one or more pillar regions through an image analysis algorithm in which a pillar detection reference for detecting pillar regions of a plurality of different pillar kinds is set in advance;

recognizes one or more seat regions in the frame image based on the detected pillar regions by performing image analysis on the frame image, using an image analysis algorithm in which an arrangement relationship between a plurality of seat regions respectively corresponding to a plurality of different preset seat numbers and pillar regions corresponding to the pillar kinds, for the respective pillar regions, is set in advance; and detects an object in each of the recognized seat regions and labels a seat region, in which an object is detected, with a seat number corresponding to the seat region;

thereby creating the first labeling information including one or more frame images labeled with seat numbers, and creating the second labeling information based on the second image information in the same way as creating the first labeling information.

8. The service system of claim 1, wherein the control device totals the number of seat numbers such that a same seat number of one or more seat numbers checked from the first labeling information is not repeatedly totaled, and calculates the totaled number of seat numbers as the number of in-vehicle persons;

totals the number of seat numbers, which do not overlap the one or more seat numbers checked from the first labeling information, of one or more seat numbers checked from the second labeling information such that a same seat number is not repeatedly totaled, and calculates the totaled number of non-repeated seat numbers as the number of additional in-vehicle persons; and calculates a final number of in-vehicle persons by adding up the calculated number of in-vehicle persons and the number of additional in-vehicle persons.

9. A service method for detecting in-vehicle persons of a vehicle running on a high occupancy vehicle lane in which a control device communicates with a first camera unit disposed diagonally to a traveling direction of a vehicle running on the high occupancy vehicle lane and configured to transmit first image information composed of a plurality of frame images by continuously photographing the vehicle and a second camera unit disposed orthogonally to the traveling direction of the vehicle and configured to transmit second image information composed of a plurality of frame images by continuously photographing the vehicle, the service method comprising:

detecting an object corresponding to an in-vehicle person of the vehicle for each of a plurality of seat regions respectively corresponding to a plurality of seats, which is separated for the in-vehicle persons sit, by performing image analysis on each of the plurality of frame images constituting the first image information, and then labeling each of seat regions in which an object is detected with a preset seat number corresponding to the seat region, thereby creating first labeling information including one or more frame images labeled with seat numbers;

creating second labeling information based on the second image information in the way of creating the first labeling information based on the first image information; and totaling the number of seat numbers such that seat numbers are not repeatedly totaled based on the first labeling information and the second labeling information, and calculate a final number of in-vehicle persons as the totaled number of seat numbers, and determining whether the vehicle violates a law about use of a high occupancy vehicle lane based on the final number of in-vehicle persons, wherein the determining whether the vehicle violates a law about use of a high occupancy vehicle lane further includes:

extracting feature information of an object detected in a seat region for each of seat regions in which an object is detected based on the first image information;

creating in-vehicle person information including the seat information of the object and a preset seat number corresponding to the seat region in which the object is detected, and matching and storing the feature information with the first labeling information created to correspond to the first image information;

creating one or more items of in-vehicle person information in the same way as creating the in-vehicle person information based on the first image information, and matching and storing the one or more items of in-vehicle person information with the second labeling information;

comparing feature information of one or more items of in-vehicle person information matched to the first labeling information or the second labeling information in accordance with a preset similarity algorithm, and when there is a plurality of items of in-vehicle person information in which similarity of feature information is a preset reference value or more and that has different seat numbers, determining the in-vehicle person information as repeated in-vehicle person information;

setting and deleting the other in-vehicle person information excluding in-vehicle person information corresponding to a most repeated seat number as deletion target in-vehicle person information by comparing the plurality of items of repeated in-vehicle person information;

checking one or more seat numbers based on one or more items of in-vehicle person information matched to the first labeling information or the second labeling information after the deletion target in-vehicle person information is deleted; and totaling the number of seat numbers such that same numbers are not repeatedly totaled for the checked one or more seat numbers, and calculating the totaled number of seat numbers as the final number of in-vehicle persons.

* * * * *